(12) United States Patent
Sturgess

(10) Patent No.: US 7,794,025 B2
(45) Date of Patent: Sep. 14, 2010

(54) BRAKING SYSTEMS

(75) Inventor: Peter Sturgess, Shropshire (GB)

(73) Assignee: J.C. Bamford Excavators Limited, Rocester, Staffordshire (GB)

( * ) Notice: Subject to any disclaimer, the term of this patent is extended or adjusted under 35 U.S.C. 154(b) by 615 days.

(21) Appl. No.: 11/692,572

(22) Filed: Mar. 28, 2007

(65) Prior Publication Data

US 2007/0236082 A1 Oct. 11, 2007

(30) Foreign Application Priority Data

Apr. 8, 2006 (GB) ................. 0607107.0

(51) Int. Cl.
*B60T 13/16* (2006.01)
(52) U.S. Cl. ........................................... 303/10
(58) Field of Classification Search ............ 303/10, 303/11, 114.1, 115.1, 115.2, 115.4, 115.5, 303/116.2
See application file for complete search history.

(56) References Cited

U.S. PATENT DOCUMENTS

| | | | |
|---|---|---|---|
| 5,013,094 A | 5/1991 | Nishii et al. | |
| 5,251,970 A | 10/1993 | Braschel et al. | |
| 5,609,399 A * | 3/1997 | Feigel et al. | 303/115.2 |
| 5,713,640 A | 2/1998 | Feigel et al. | |
| 6,161,903 A | 12/2000 | Dieringer | |
| 6,195,995 B1 | 3/2001 | Bartsch | |
| 6,244,393 B1 * | 6/2001 | Weidenweber et al. | 188/71.8 |
| 2005/0140206 A1 * | 6/2005 | Sturgess | 303/114.3 |
| 2007/0138864 A1 | 6/2007 | Fitton et al. | |

FOREIGN PATENT DOCUMENTS

| | | |
|---|---|---|
| EP | 0 317 182 | 5/1989 |
| EP | 0317182 | 5/1989 |
| EP | 1 550 594 | 7/2005 |
| JP | 62231860 | 10/1987 |
| JP | 63013850 | 1/1988 |

OTHER PUBLICATIONS

Search Report, Corresponding to British Application No. GB0607107.0, Completed Jul. 26, 2006.
European Search Report, Corresponding to European Application No. EP 07 00 5950, Completed on Apr. 10, 2008.

* cited by examiner

*Primary Examiner*—Thomas J Williams
(74) *Attorney, Agent, or Firm*—Greenlee Sullivan P.C.

(57) ABSTRACT

A braking system includes a brake actuator which is moveable by pressurised hydraulic fluid fed to the actuator along a transmission line, in a first direction, to move a brake applying member to apply a braking force to a member to be braked, a master valve including an operating piston which upon operation of a brake operating member, moves in an operating cylinder, to direct the hydraulic fluid under pressure to the transmission line to apply the brake, the system further including a charging valve, the charging valve being operable when activated, to deliver a predetermined volume of pressurised hydraulic fluid to the master valve to move the brake applying member in the first direction towards the member to be braked to reduce the clearance between them, and the operating piston, when the charging valve is deactivated, being moveable in the operating cylinder to allow hydraulic fluid to pass from the transmission line thus to permit the brake actuator to move in a second direction opposite to the first direction to increase the running clearance between the brake applying member and the member to be braked.

22 Claims, 5 Drawing Sheets

BRAKING SYSTEMS

CROSS-REFERENCE TO RELATED APPLICATIONS

This United States application claims the benefit of Great Britain Patent Application No. 0607107.0, filed Apr. 8, 2006, which is hereby incorporated by reference in its entirety to the extent not inconsistent with the disclosure herein.

BACKGROUND TO THE INVENTION

This invention relates to a braking system and more particularly to a braking system which includes a brake actuator which is moveable by pressurised brake fluid to bring a braking member into contact with a member to be braked to apply braking. More particularly but not exclusively the invention has been developed for a braking system in which the brake actuator moves a brake applying member including a first plurality of discs and the member to be braked is a second plurality of rotating discs interleaved with the plurality of discs of the brake applying member, and when the brake is applied, the discs of the brake applying member are moved into contact with the discs of the member to be braked to apply a braking force to the member to be braked.

The discs of such a braking system typically are immersed in oil, and the actuator is typically hydraulically powered. The brake fluid which moves the brake applying member is typically supplied by a master valve, commonly referred to as a master cylinder, which includes a piston assembly which is manually moveable, e.g. by a brake pedal, to provide pressurised brake fluid to the brake actuator along a transmission line between the master valve and a brake actuator assembly which includes the brake applying member.

Particularly but not exclusively in a "wet disc" brake system, it will be appreciated that a running clearance must be provided between the discs moved by the actuator and the discs of the member to be braked, to prevent uneven wear and/or to reduce parasitic losses resulting from churning of oil between the discs when the brake is not applied. These parasitic drag losses increase exponentially as the relative rotational speed between the discs moved by the brake actuator and the discs of the member to be braked, increases.

However, as more running clearance is provided between the respective discs when the brake is not applied, it will be appreciated that more hydraulic fluid will be required from the master valve to apply the brake, thus requiring greater movements of the foot pedal or other manual brake operating member, and that large such manual movements are undesirable.

Large running clearances are really only required at high relative rotational speeds between the discs of the brake applying member and the discs of the member to be braked, i.e. in the case of an earthmoving or load handling machine, at high travelling speeds, e.g. when the machine is being driven in its highest gear at full throttle.

DESCRIPTION OF THE PRIOR ART

In our previous patent application EP-A-1550594 there is disclosed a proposal for a master cylinder in which within the master cylinder there is provided a piston assembly including a pair of pistons which are moveable apart and towards one another a restricted amount. A charging valve may be operated to provide pressurised hydraulic fluid between the pistons to move the pistons apart. When the pistons are maximally apart, one of the pair of pistons is thus urged in its cylinder to displace fluid to effect a reduction in the clearances between the discs of the brake applying member, whereas when no pressurised fluid is applied, a spring moves the pistons together to increase the running clearances.

By virtue of the pair of pistons only being able to move apart and together a restricted amount, the running clearances between the discs of the brake applying member can only be increased to a restricted extent.

Whereas our previous proposal operates satisfactorily, a master cylinder of special construction is required, and the arrangement is not readily adaptable where a pair of master cylinders are provided which are required to be operable both separately and together, for example where the braking system is provided on an earthmoving or load handling machine for examples only.

SUMMARY OF THE INVENTION

According to a first aspect of the invention we provide a braking system including a brake actuator which is moveable by pressurised hydraulic fluid fed to the actuator along a transmission line, in a first direction, to move a brake applying member to apply a braking force to a member to be braked, a master valve including an operating piston which upon operation of a brake operating member, moves in an operating cylinder, to direct the hydraulic fluid under pressure to the transmission line to apply the brake. The system further includes a charging valve, the charging valve being operable when activated, to deliver a predetermined volume of pressurised hydraulic fluid to the master valve to move the brake applying member in the first direction towards the member to be braked to reduce the clearance between them, and the operating piston, when the charging valve is deactivated, being moveable in the operating cylinder to allow hydraulic fluid to pass from the transmission line thus to permit the brake actuator to move in a second direction opposite to the first direction to increase the running clearance between the brake applying member and the member to be braked.

Thus in a braking system in accordance with the invention, for normal use of the system, e.g. where applied for braking travelling of an earthmoving or load handling machine for example only, at less than a predetermined speed, the charging valve may be activated so that the brake actuator is moved in the first direction, to reduce running clearance, so that a braking force may be applied without requiring an unduly great movement of the manual brake operating member, but under predetermined conditions, such as when the machine is travelling at high speeds, the charging valve may be deactivated, so as to allow the brake actuator to move in the second direction thereby to achieve a greater running clearance between the member to be braked and the brake applying member, to reduce any parasitic losses occurring as a result of the brake applying member and member to be braked being close. For example, where the invention is applied to a braking system in which the brake applying member and member to be braked include interleaved discs immersed in oil, parasitic losses may be reduced at high travelling speeds by the greater running clearance.

Moreover, such a brake operating system may include a conventional master valve, or at least a conventional master valve, modified in only a minor way, and the invention may be applied where there is more than one master valve, or where the master valve is a servo assisted valve.

In a preferred embodiment, the braking system includes a source of pressurised hydraulic fluid, the charging valve when activated, permitting the pressurised hydraulic fluid from the source to move a charging piston from an initial position in a charging cylinder, to displace hydraulic fluid which is directed to the master valve, and when deactivated, the charging valve connecting the charging cylinder to a low pressure area to permit the charging piston to return to the initial position.

The invention is particularly applicable where the braking system is for a machine which includes a ground engaging structure by means of which the machine may travel on the ground, in which case the source of high pressure fluid for the charging valve, may be a hydraulic pump which may provide hydraulic fluid for use by other hydraulic fluid operated services of the machine too. In one embodiment, the low pressure area to which the hydraulic fluid may pass from the charging valve when the charging valve is deactivated is a tank of the machine from which a pump draws or to which returns, the hydraulic fluid for use by services of the machine.

The pump may provide the pressurised hydraulic fluid to an accumulator where the fluid may be stored for use in the charging valve, when required.

Preferably the hydraulic fluid in the master valve and which is provided in the or each transmission line, is first hydraulic fluid e.g. hydraulic brake grade hydraulic fluid, and the hydraulic fluid from the pressurised hydraulic fluid source is second hydraulic fluid, such as hydraulic fluid which may be used by other hydraulic fluid operated services of the vehicle or machine to which the invention is applied, the first and second hydraulic fluids being isolated from one another by the charging piston.

A reservoir of first hydraulic fluid may be provided, which may communicate with the charging cylinder of the charging valve at least when the charging piston is in its initial position, to replenish the braking circuit with first hydraulic fluid as required. Movement of the charging piston to displace the first hydraulic fluid in the charging cylinder may obstruct communication of the charging cylinder with the reservoir, to ensure that only the predetermined volume is displaced when the charging valve is activated.

Where the invention is applied to a brake system in which there is a single master valve, the hydraulic fluid displaced by the movement of the charging piston may be the predetermined volume of hydraulic fluid which is directed to the master valve. Where the invention is applied to a brake system in which there are two or more master valves, the hydraulic fluid displaced by the movement of the charging piston from the initial position, may be shared, to deliver a predetermined volume of pressurised fluid to each of the master valves.

Desirably the hydraulic fluid which is directed to the or each master valve, is fed to an inlet port of the or the respective brake operating cylinder of the master valve, the inlet port being closed by the operating piston when the brake operating member is operated to apply the brake.

The charging valve preferably is an electrically operated valve such as a solenoid operated, or step motor operated valve, for examples only. The charging valve may be operated either to cause a valve member to move to an activating position so as to allow the pressurised hydraulic fluid from the source, to act upon the charging piston to activate the charging valve, or to cause the valve member to move to a deactivated position to prevent the pressurised hydraulic fluid from the source from acting upon the charging piston and to permit the relief of pressurised hydraulic fluid to permit the charging piston to be moved back to its initial position.

Preferably the charging piston is moved back to its initial position by a restoring force which may be provided by a spring or like biasing device.

The charging valve may be activated and deactivated by a controller, in response to an input from a sensor device or directly by a switch.

In one example where the braking system is for a machine with a ground engaging structure, the sensor device may sense at least one operating parameter of the machine, or a driver movement or action. The at least one operating parameter may be operation of a gear selector. For example the sensor device may sense operation of the gear selector to change from top gear to a lower gear and the controller may in response activate the charging valve, and/or conversely the sensor device may sense operation of the gear selector to select top gear and the controller may in response deactivate the charging valve.

Alternatively the at least one operating parameter may be one of a movement of an accelerator control and/or the road speed. For example the sensor device may sense when the accelerator control is moved to an extent above a threshold value, for example to reduce the speed of the machine, and the controller may in response activate the charging valve. Conversely, the sensor device may sense when the accelerator control is moved to or near to its maximum extent to select top or near top speed, and the controller may in response deactivate the charging valve.

Further alternatively the at least one operating parameter may be a movement of a manual brake operating member. For example, the sensor device may sense any operation of the manual brake operating member, and the controller may in response activate the charging valve.

In each of the examples described above, a restoring force to urge the brake actuator against the force exerted by the pressurised hydraulic fluid, for example to release the brake, may be provided by a resilient element such as a spring, or otherwise as required.

Whereas such restoring force may also be operable to direct fluid from the transmission line back to the charging valve to move the charging piston back to its initial position when the charging valve is deactivated, desirably the master valve includes a resilient element such as a spring, to urge the operating piston back towards its initial position According to a second aspect of the invention we provide a machine with a ground engaging structure by means of which the machine may be driven on the ground, and a braking system according to the first aspect of the invention.

BRIEF DESCRIPTION OF THE DRAWINGS

Embodiments of the invention will now be described with the aid of the accompanying drawings in which:—

DETAILED DESCRIPTION OF THE PREFERRED EMBODIMENTS

Figure 1:
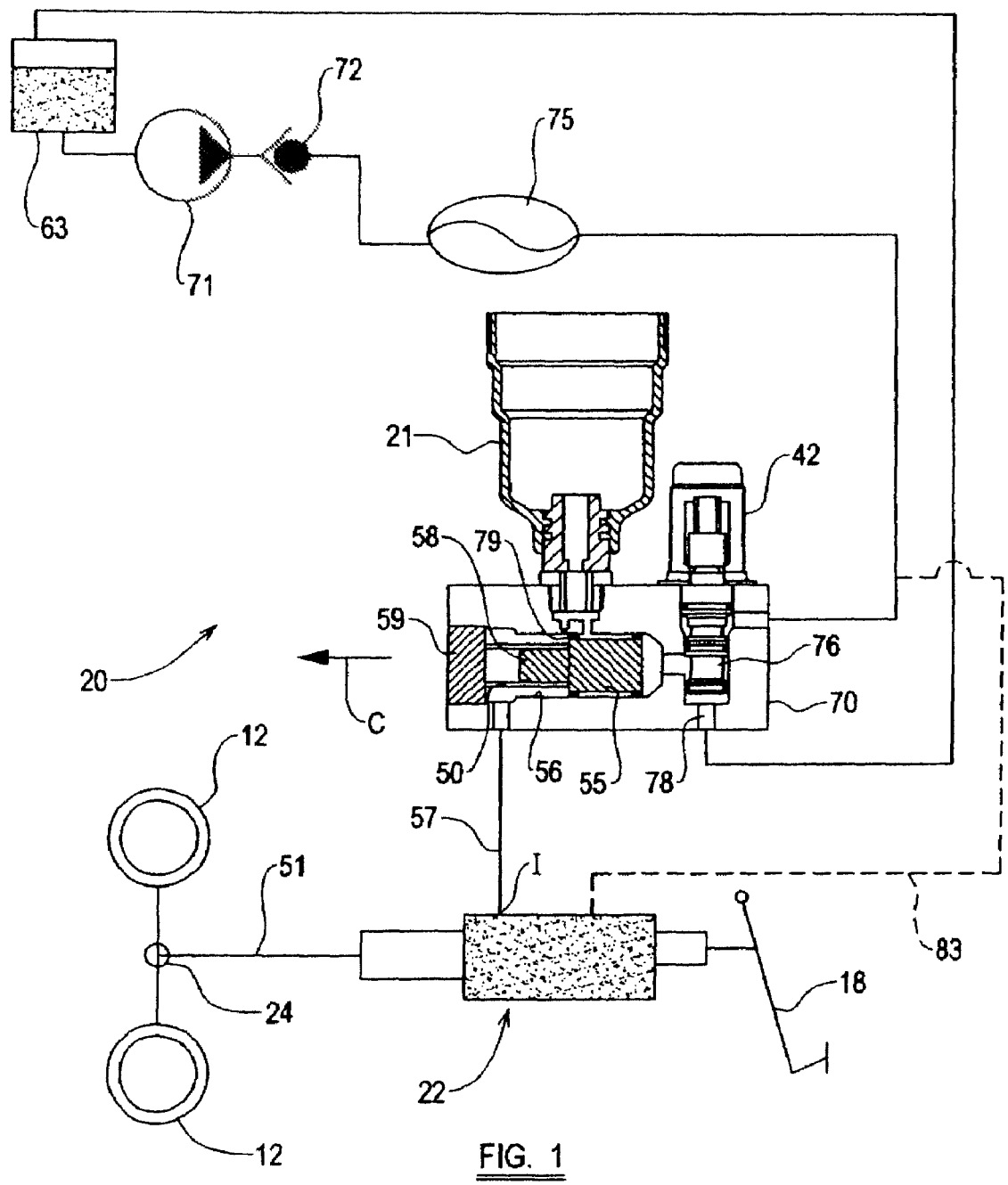
FIG. 1 is an illustrative diagram of a braking system in accordance with the invention where applied to a machine having a pump to supply hydraulic fluid to operate services of the machine.
Figure 4:
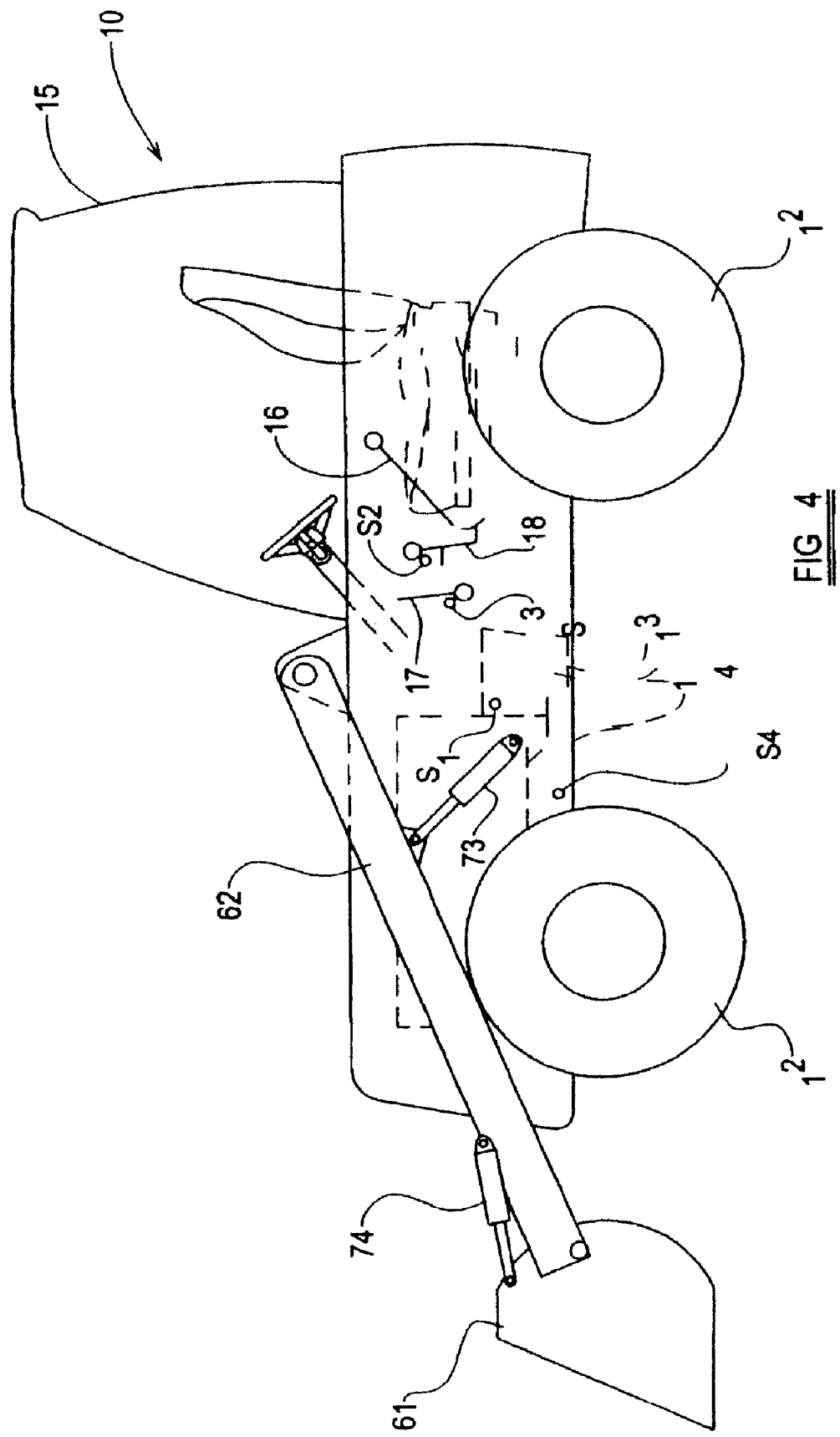
FIG. 4 is an illustrative view of a machine to which the braking assembly of FIG. 1 may be applied.

Referring to FIGS. 1 and 4, an earthmoving machine 10 has a ground engaging structure which in this example includes four wheels 12, which are each driven through a transmission which includes a gearbox 13, from an engine 14. The machine 10 is controlled by an operator from within an operator's cab 15, where there is a gear selector 16, and an accelerator control which in this example is a foot pedal 17, and manual brake operating member, namely a foot brake pedal 18, for manually applying the brakes.

The machine 10 includes a braking system 20. Practically, all four wheels 12 of the machine 10 may have associated brakes, or axles carrying the wheels 12 may be braked, to reduce the speed of the machine 10 as it travels on the ground. In the illustrated example, the machine 10 is braked by braking an axle carrying rear wheels 12 of the ground engaging structure.

The braking system 20 includes a fluid reservoir 21 for, first, hydraulic grade brake fluid and from which brake fluid may be drawn to replenish brake fluid of the braking system 20.

The system 20 further includes a master valve 22. The master valve 22 includes an operating piston 40 which will be described below with reference to FIG. 2, which is moveable by the operation of the foot brake pedal 18 to move pressurised brake fluid to move a brake applying member of a brake actuator assembly 24, to apply braking.

Figure 3:
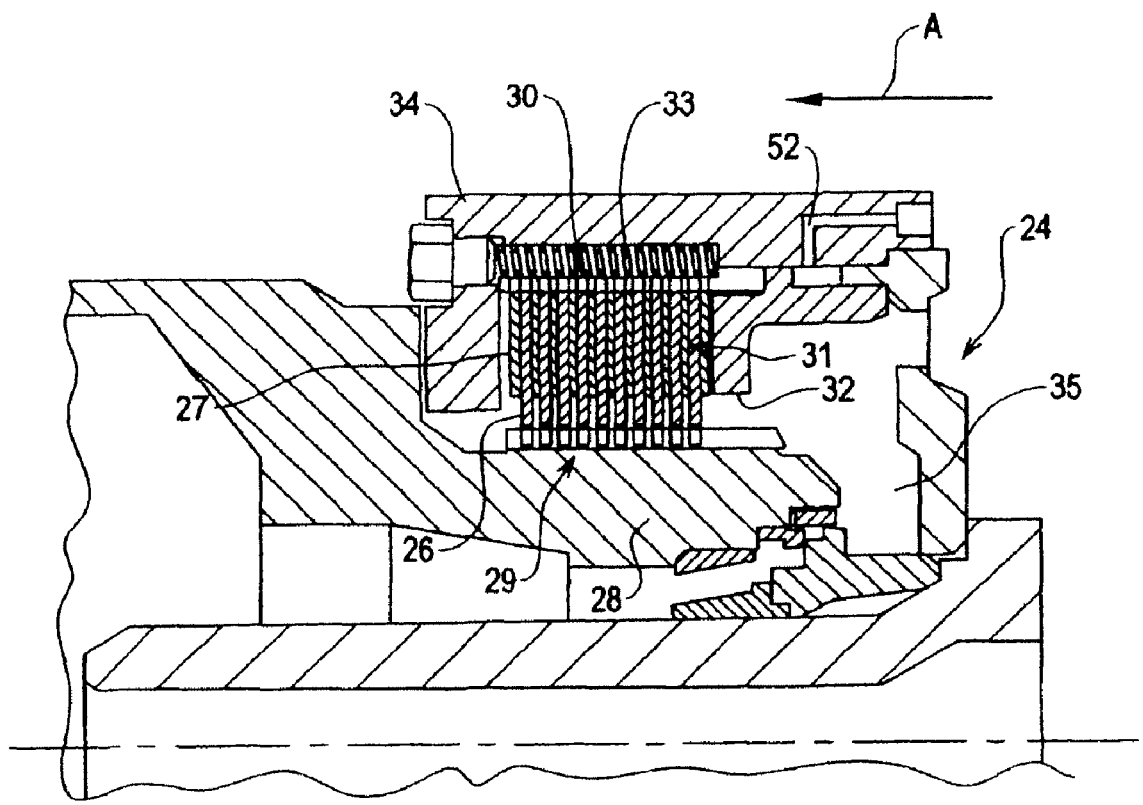
FIG. 3 is an illustrative cross sectional view through a brake actuator assembly of the braking system of FIG. 1.

In FIG. 3 an example of a brake actuating assembly 24 is illustrated. This is a so-called "wet" disc arrangement, which includes a disc pack which includes two sets of discs 26, 27 that rotate in use, relative to one another.

One set of the discs 26 is rotatable with a shaft 28 and thus with the shaft, provides a rotating member 29 to be braked. Each disc is therefore a member to be braked. The shaft 28 may be connected to the, or one of the wheels 12 of the machine 10 e.g. via the axle.

The discs of the other set of discs 27 are non-rotatable and each provide a respective brake applying member 31, the discs 27 all being movable by a brake actuator 32 which in this example is a piston. The discs of the first set 26 are interleaved with the discs of the second set 27 and so each disc 26 has at least one corresponding disc 27 which prior to the brake being applied, are spaced apart by a running clearance, and when the brake is applied, the respective discs 26, 27 are brought into contact.

The discs of the second set 27 are moveable in a first direction indicated by arrow A in FIG. 3, by the brake actuator 32, via a disc mounting member 30 with which the discs 27 are all held fast, towards the discs of the first set 26. Only if the movement of the second disc set 27 in the first direction A is sufficient, will braking be effected as the discs of the first and second sets 26, 27 frictionally engage. The discs 26, 27 are all immersed in oil which is contained in a volume 35 of the brake actuator assembly 24 in which the discs 26, 27 are provided.

A resilient element, namely a spring 33 is provided in this example, which is operable to act between the piston 32 and a housing 34 of the brake actuator assembly 24, to urge the piston 32 in a second direction opposite to the first direction A, to allow movement of the respective discs 26, 27 away from one another when the brake is released.

In another example no spring as such may be provided but the piston 32 may be moved in the second direction to allow the respective discs 26, 27 to move apart, by some other means, for example by the action of a resilient seal which deforms when the piston 32 is moved in the first direction, and resiliently returns to its pre-deformed condition when the brake pressure is released.

Otherwise the brake actuator assembly 24 shown in FIG. 3 is conventional.

In accordance with the invention, running clearances between the discs of the first and second sets 26, 27 may be increased for certain machine 10 operating conditions, to reduce parasitic losses occurring between the discs 26, 27 as a result of churning of the oil in which the discs 26, 27 are immersed. Thus the running clearances between each disc of the first set of discs 26 which are members to be braked, and the each corresponding brake applying member disc 27, may be increased.

Figure 2:
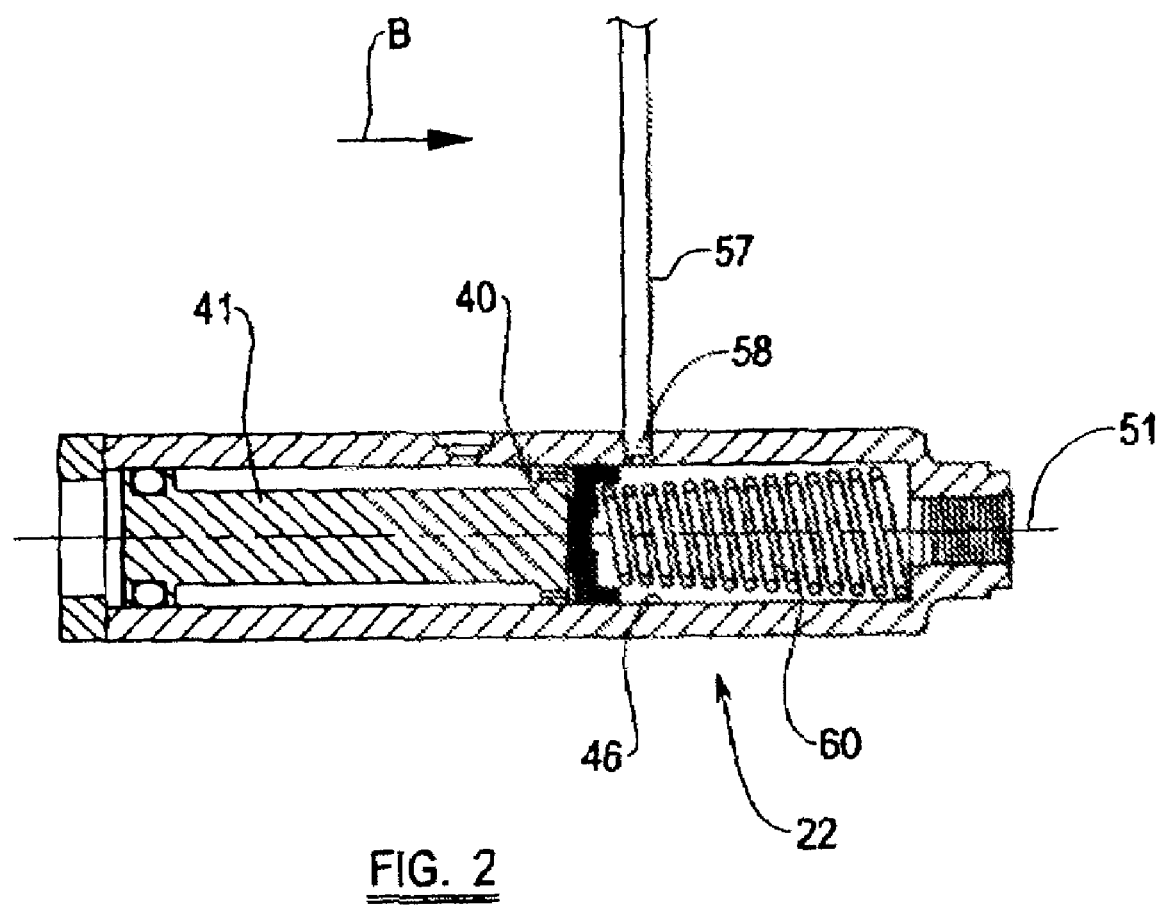
FIG. 2 is an illustrative more detailed and cross sectional view of a master valve of the braking system of FIG. 1.

Referring to FIG. 2, the master valve 22 includes an operating piston 40 carried on an operating rod 41, which is moveable by the brake foot pedal 18 or other manual brake operating member, to apply the brake, in the direction indicated in FIG. 2, at B. In response to the brake pedal 18 being depressed, the operating piston 40 will move from a rest position as shown in FIG. 2, in an operating cylinder 46 to move pressurised hydraulic fluid along a transmission line 51 between the master valve 22 and the brake actuator assembly 24, thus to apply the brake.

The pressurised brake fluid from the transmission line 51 is received in an inlet port 52 of the brake actuator assembly 24 and acts on the piston 32 to bring the discs of the first and second sets 26, 27 into frictional engagement.

Upon the brake operating member 18 being released, the spring 30 of the brake actuator assembly 24 acts to release braking by moving the interleaved discs 26, 27 relatively apart. Brake fluid is displaced from the brake actuator assembly 24 and passes back into the transmission line 51. The returning brake fluid, and a coil spring 60 which opposes operating piston 40 movement in the direction B in the master valve 22, act together to move the operating piston 40, back to its rest position.

Referring again to FIG. 1, the brake system 20 includes a charging valve 70. The charging valve 70 includes a charging piston 55 which is moveable in a charging cylinder 56 full of brake fluid from the brake fluid reservoir 21. The charging cylinder 56 to one side of the charging piston 55 is connected via a transmission line 57 to an inlet port 58 of the master cylinder 22. The inlet port 58 opens into the area of the master cylinder 22 downstream of the operating piston 40, which port 58 communicates with the transmission line 51 to the brake actuator assembly 24.

In FIG. 1, the charging piston 55 is shown in an initial position towards which the charging piston 55 is urged by a biasing device, in this example a coil spring 50. It will be appreciated that in the event that the charging piston 55 is moved in the charging cylinder 56 in the direction indicated at C in FIG. 1, against the restoring force of the spring 50, brake fluid will be displaced from the charging cylinder 56 and this will result in a volume of brake fluid being directed into the transmission line 57 to the master valve 22 via an inlet port I, through the master valve 22 and hence to the transmission line 51 between the master valve 22 and the brake actuator assembly 24.

The charging piston 55 includes a stop 58 which as the charging piston 55 moves to displace fluid, will engage a closure formation 59, to restrict charging piston 55 movement. Charging piston 55 movement will thus result in a predetermined volume of the brake fluid being displaced, which will have the effect of reducing the running clearances between the interleaved discs 26, 27. This is the usual condition of the braking assembly 20 when the machine 10 is in use.

When the charging piston 55 moves back towards its rest position primarily by the restoring force of the spring 50 acting on the charging piston 55, a predetermined volume of the brake fluid may pass from the brake actuator assembly 24 and transmission lines 51, 57 to fill the charging cylinder 56 which will have the effect of allowing the interleaved discs 26, 27 to move further apart thus to increase the running clearances between the discs 26, 27.

During normal machine 10 operation, when the machine 10 may be travelling below full speed and perhaps not in top gear, e.g. during earthmoving operations using an earthmoving arm 62 and/or bucket 61, the charging piston 55 will be moved as hereinafter explained, in direction C so that a minimum running clearance between the respective discs 26, 27 is achieved. Under certain operating conditions though, for example when the machine 10 is travelling at a high speed in top gear, the operating piston 55 may be allowed to move back to the initial position, so that greater running clearances between the interleaved discs 26, 27 is maintained.

The charging valve 70 is electrically controlled, in this example by a solenoid 42 although may be controlled by other electrical actuation such as a stepper motor or the like. The solenoid 42 when energised, moves a valve member 76. When the solenoid 42 is de-energised, the valve member 76 is urged by a spring to a first position in which pressurised, second, hydraulic fluid from a source 71, 75 of pressurised fluid can pass to act on the charging piston 55 to move the charging piston 55 against the spring 60 in direction C, so that the charging valve 70 is activated. When the solenoid 42 is energised, the valve member 76 is moved against the solenoid spring, to a second position, in which the pressurised hydraulic fluid from the source 71, 75 cannot act on the charging piston 55, and the charging valve 70 is deactivated. Moreover, when the valve member 76 is in the second position, any pressurised second hydraulic fluid in the charging cylinder 56 behind the charging piston 55 may pass via an outlet 78 back to the tank 63 or to another low pressure area. Thus the charging piston 55 will be freed to move back to its initial position by the restoring force of the spring 50.

In this example, the source of pressurised, second, hydraulic fluid is a hydraulic pump 71 of the machine 10, which is provided for supplying pressurised hydraulic fluid from the tank 63 via a one way valve 72, to various services of the machine, such as an actuator 73 for raising a working arm 62 or an actuator 74 for tilting a bucket 61. The pump 71 supplies the highly pressurised hydraulic fluid to an accumulator 75, and hence to the charging valve 70. The accumulator 75 stores the pressurised fluid for use in the charging valve 70 when required.

Thus the second hydraulic fluid for operating services of the machine 10 is different to the first hydraulic brake grade fluid used for braking. The charging piston 55 isolates the first and second hydraulic fluids so they do not mix.

The brake fluid reservoir 21 communicates via an inlet port 79 with the charging cylinder 56 at one side of the charging piston 55, at least when the charging piston 55 is in its initial position. Thus replenishing brake fluid may be introduced into the charging cylinder 56, the transmission lines 51, 57 and the master valve 22. However as the charging piston 55 is moved by the hydraulic fluid pressure from the source 71,75 when the solenoid 73 is deactivated, the charging piston 55 will obstruct and block the inlet port 79 to the charging cylinder 56, so that the predetermined volume of brake fluid may be displaced from the charging cylinder 56.

The charging valve 70 operation is controlled by a controller 74 which may be a stand alone component or a component integrated with other controllers controlling machine 10 operation.

Although, the charging valve 70 may be operated according to any desired control regime, preferably the controller 74 operates the charging valve 70 so that minimum running clearances between the respective interleaved discs 26, 27 are maintained so that minimum brake foot pedal 18 travel is required to operate the brake, e.g. when performing working tasks such as earthmoving with the machine 10, by operating the charging valve 70 to permit the pressurised hydraulic fluid from the source 71,75 to act upon and move the charging piston 55 from its initial position. However, when the machine 10 is travelling on the ground at top speed or nearly top speed, greater running clearances between the interleaved discs 26 and 27 may be maintained to minimise parasitic losses, by energising the solenoid 73 and hence deactivating the charging valve 70.

A sensor device S1 may be provided on the gearbox 13 to sense when the machine 10 is being driven in top gear, and/or a sensor device S2 may be provided to sense operation of the brake foot pedal 18 and/or a sensor device S3 may be provided on the accelerator control pedal 17 and/or a sensor device S4 may be provided to determine wheel, i.e. road speed, in each case to provide a signal or signals to the controller 74 which controls the charging valve 70.

The controller 74 is arranged to activate the charging valve 70 by de-energising the solenoid 73 thus to decrease the running clearances between the interleaved discs 26, 27 immediately that the gear in which the machine 10 is driven is changed from top gear and/or immediately the brake foot pedal 18 is depressed to reduce machine 10 speed and/or immediately the accelerator pedal 17 is released beyond a threshold and/or immediately road speed reduces beyond a threshold.

Inputs from at least one such sensor S1-S4 may be used as desired by a control algorithm of the controller 74, to ensure that minimal brake foot pedal 18 travel is required when it is desired to apply the brakes, and maximum running clearances between the respective interleaved discs 26, 27 are maintained to reduce parasitic losses when it is safe to do so.

Further features of the invention are as follows.

The system 20 is fail safe in that in the event of the failure of the solenoid 42 of the charging valve 70 depression of the brake foot pedal 18 will still result in application of the brake. In the event of failure of the high pressure fluid supply provided by the accumulator 75 and pump 71, depression of the foot pedal 18 will again still result in application of the brake, albeit that a greater pedal movement that otherwise would be required, would be necessary, as the charging piston 55 will be moved to the initial position shown in FIG. 1 by the spring 50.

It will be appreciated that the operating piston 40 and the inlet port I which communicates with the transmission line 57 from the charging valve 70 are so arranged, that upon initial movement of the operating piston 40 when the brake is applied, the inlet port I is closed so as to seal the operating cylinder 46 of the master valve 22, to ensure that fluid is not displaced from the operating cylinder 46 to the transmission line 57 and hence to the charging valve 70.

Various other modifications are possible without departing from the scope of the invention. For example the invention may be applied to other than multiple wet disc type brake systems, where it is desired to increase the running clearance between a brake applying member 31 and the member 29 to be braked under certain operating conditions. The invention is not only applicable to an earthmoving machine 10 but may be applied to other working machines such as loading machines, cranes, tractors and the like, and to vehicles including automobiles, trucks and lorries, or to non-mobile industrial plant where there is a manually operated braking member or a non-manual brake operating member to apply the brake.

The invention may be applied to brake systems where there are multiple brake pedals 18 or other manually operated braking members, such as for example where there are two brake pedals 18, one for each rear brake.

Figure 5:
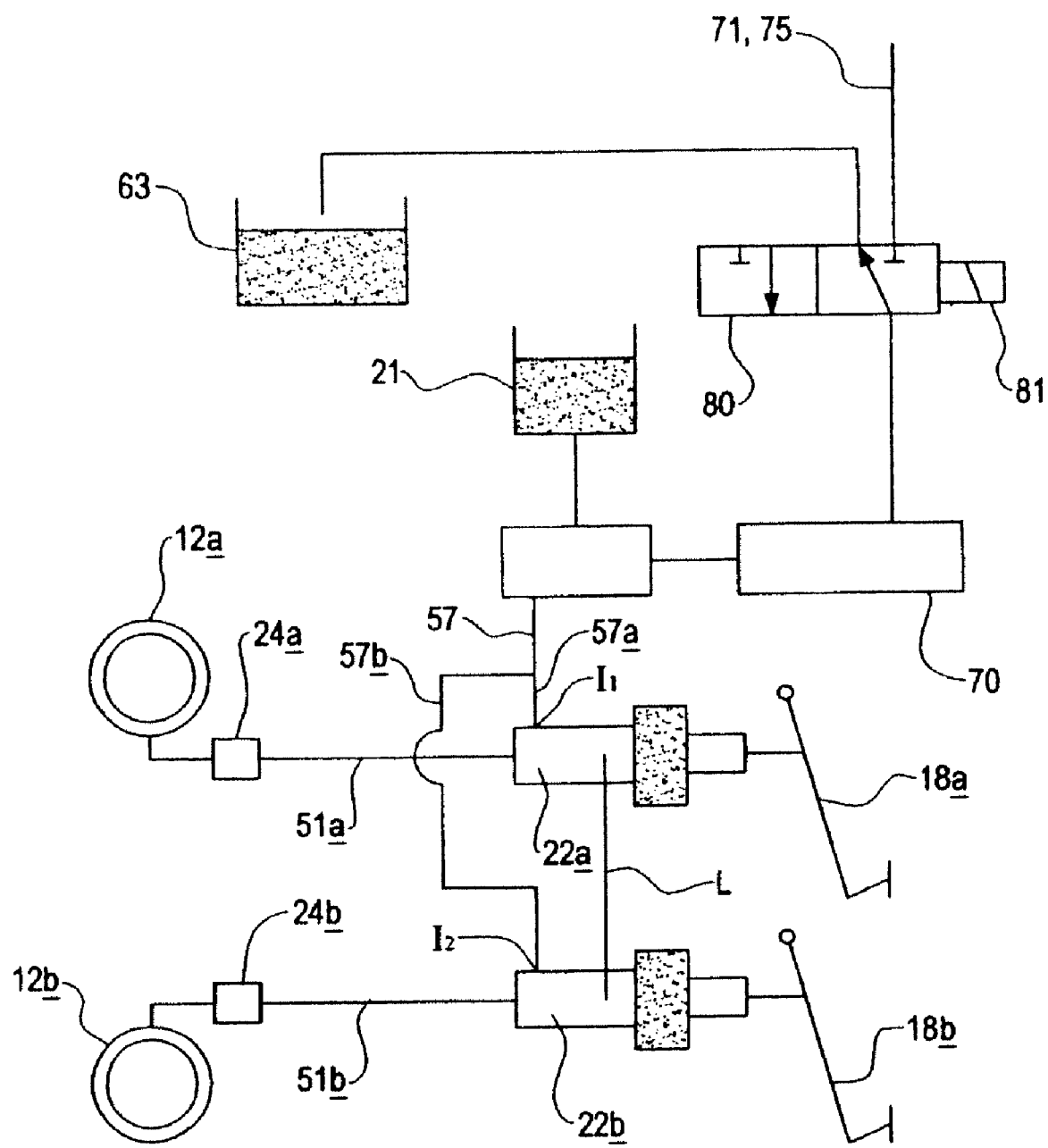
FIG. 5 shows a modified braking system in accordance with the present invention.

Such an arrangement is illustrated in FIG. 5 in which similar parts to those already described are indicated with the same references. FIG. 5 includes other alternative constructional features too.

In this an arrangement a common charging valve 70 is provided for both of a pair of brakes, and a master valve 22*a*, 22*b* is provided for each brake, although these may be incorporated in a common master valve housing as required.

Each of two brake pedals 18*a*, 18*b* may be depressed individually or together, to apply a braking force for a respective one only of the rear wheels 12*a*, 12*b* via a respective brake actuator assembly 24*a*, 24*b* which may each be constructed and operate the same as brake actuator assembly 24 already described.

The master valves 22*a*, 22*b* are each compensated valves in that the load pressure established by both of the master valves 22*a*, 22*b* is communicated to a load sensing line L between the master valves 22*a*, 22*b*, the combined load pressures in the load sensing line L acting upon a compensator of each master valve 22*a*, 22*b* which acts to balance the pressures transmitted to the respective brake actuator assemblies 24*a*, 24*b* along the respective transmission lines 51*a*, 51*b*.

Thus where both of the brake pedals 18*a*, 18*b* are depressed together, the braking achieved by the brake actuator assemblies 24*a*, 24*b* of the two wheels 12*a*, 12*b* is balanced, regardless of manufacturing tolerances and individual brake wear.

In this example it will be appreciated that the volume of brake fluid which is displaced by the charging piston 55 of the charging valve 70 when the charging valve 70 is activated, needs to be twice the predetermined volume required to reduce the running clearances of the interleaved discs 26, 27 of both of the individual brake actuator assemblies 24*a*, 24*b*. The fluid which is displaced from the charging valve 70 is fed to and thus shared between inlet ports $I_1$, $I_2$ of each of the master valves 22*a*, 22*b* from respective transmission lines 57*a*, 57*b*, which inlet ports 58*a*, 58*b* communicate with the respective transmission lines 51*a*, 51*b* to each of the brake actuator assemblies 24*a*, 24*b*.

Also in the FIG. 5 embodiment, the charging valve 70 is not a solenoid controller valve. Rather, upstream of the charging valve 70 there is an electrically controlled spool valve 80 which is switchable between first and second operating states by the controller 74, to activate or deactivate the charging valve 70.

In a second operating state shown in the figure, the spool valve 80 isolates the charging valve 70 from the pressurised fluid source 71, 75, but permits the charging cylinder 56 to a rear side of the charging piston 55 to communicate with the tank 63, to permit the charging piston 55 of the charging valve 70 to be moved by its spring 50 to its initial position. The spool of the spool valve 80 assumes the second operating state when the solenoid 81 thereof, is energised, and it is desired to increase the running clearance between the member to be braked and the braking member.

In a first operating state, the spool of the spool valve 80 allows communication of the high pressure hydraulic fluid from the source 71, 75 to act upon and thus move the charging piston 55, to displace hydraulic fluid from the charging valve 70 and thus cause a reduction in the running clearance between the member to be braked and the braking member.

As indicated in this example, the source 71, 75 of pressurised hydraulic fluid need not include an accumulator 75.

In another embodiment of the invention, the master valve 22 or master valves may be servo assisted valves. For example, in FIG. 1 a dotted line 83 indicates how the high pressure hydraulic fluid from the source 71, 75 may be directed to the master valve 22, which would be a servo master valve 22.

Provision of the invention does not preclude the provision of servo assistance, or other powered braking, or of safety systems such as ABS.

In the examples described, the charging valve 70 is activated by an electrical device such as the solenoid 73 the solenoid 81 of the spool valve 80 is de-energised. In another example, the charging valve 70 may be activated by an electrical device being energised.

The invention claimed is:

1. A braking system including a brake actuator which is moveable by pressurised hydraulic fluid fed to the actuator along a transmission line, in a first direction, to move a brake applying member to apply a braking force to a member to be braked, a master valve including an operating piston which upon operation of a brake operating member, moves in an operating cylinder, to direct the hydraulic fluid under pressure to the transmission line to apply the brake, the system further including a charging valve, the charging valve being operable when activated, to deliver a predetermined volume of pressurised hydraulic fluid to an inlet of the master valve, and hence to the transmission line, so as to move the brake applying member in the first direction towards the member to be braked to reduce the clearance between them, and the operating piston, when the charging valve is deactivated, being moveable in the operating cylinder to allow hydraulic fluid to pass from the transmission line thus to permit the brake actuator to move in a second direction opposite to the first direction to increase the running clearance between the brake applying member and the member to be braked and which includes a source of pressurised hydraulic fluid, the charging valve when activated, permitting the pressurised hydraulic fluid from the source to move a charging piston from an initial position in a charging cylinder, to displace hydraulic fluid which is directed to the master valve, and when deactivated, the charging valve connecting the charging cylinder to a low pressure area to permit the charging piston to return to the initial position.

2. A braking system according to claim 1 wherein the brake applying member and member to be braked include interleaved discs immersed in oil.

3. A braking system according to claim 1 wherein the braking system is for a machine which includes a ground engaging structure by means of which the machine may travel on the ground, the source of high pressure fluid for the charging valve, including a hydraulic pump which provides hydraulic fluid for use by other hydraulic fluid operated services of the machine too.

4. A braking system according to claim 3 wherein the pump provides the pressurised hydraulic fluid to an accumulator where the fluid is stored for use in the charging valve, when required.

5. A braking system according to claim 1 wherein the low pressure area to which the hydraulic fluid may pass from the charging valve when the charging valve is deactivated is a tank of the machine from which a pump draws or to which returns, the hydraulic fluid for use by services of the machine.

6. A braking system according to claim 1 wherein the hydraulic fluid in the master valve and which is provided in the transmission line, is a first hydraulic fluid and the hydraulic fluid from the pressurised hydraulic fluid source is a second hydraulic fluid, the first and second hydraulic fluids being isolated from one another by the charging piston.

7. A braking system according to claim 6 wherein a reservoir of first hydraulic fluid is provided, which communicates with the charging cylinder of the charging valve at least when the charging piston is in its initial position.

8. A braking system according to claim 7 wherein movement of the charging piston to displace the first hydraulic fluid in the charging cylinder obstructs communication of the charging cylinder with the reservoir.

9. A braking system according to claim 1 wherein there is a single master valve, the hydraulic fluid displaced by the movement of the charging piston being the predetermined volume of hydraulic fluid which is directed to the master valve.

10. A braking system according to claim 1 wherein there are two or more master valves and two or more respective transmission lines, the hydraulic fluid displaced by the movement of the charging piston from the initial position, being shared, to deliver a predetermined volume of pressurized fluid to an inlet of each of the master valves and hence to the respective transmission lines.

11. A braking system according to claim 1 wherein the hydraulic fluid which is directed to the or each master valve, is fed to an inlet port of the or the respective brake operating cylinder of the master valve, the inlet port being closed by the operating piston when the brake applying member is operated to apply the brake.

12. A braking system according to claim 1 wherein the charging valve is an electrically operated valve, the charging valve being operable either to cause a valve member to move to an activating position so as to allow the pressurised hydraulic fluid from the source, to act upon the charging piston to activate the charging valve, or to cause the valve member to move to a deactivating position to prevent the pressurised hydraulic fluid from the source from acting upon the charging piston and to permit the relief of pressurised hydraulic fluid to permit the charging piston to be moved back to its initial position.

13. A braking system according to claim 12 wherein the charging piston is moved back to its initial position by a restoring force provided by a biasing device.

14. A braking system according to claim 12 wherein the charging valve is activated and deactivated by a controller, in response to an input from a sensor device.

15. A braking system according to claim 14 wherein where the braking system is for a machine with a ground engaging structure, the sensor device senses an operating parameter of the machine being operation of a gear selector to change from top gear to a lower gear, the controller in response activating the charging valve, and/or upon the sensor device sensing operation of the gear selector to select top gear, the controller in response, deactivating the charging valve.

16. A braking system according to claim 14 wherein where the braking system is for a machine with a ground engaging structure, the sensor device senses an operating parameter of the machine being one of movement of an accelerator control, and/or a road speed.

17. A braking system according to claim 16 wherein where the sensor device senses movement of an accelerator control, the sensor device sensing when the accelerator control is moved to an extent above a threshold value to reduce the speed of the machine, and the controller in response activating the charging valve.

18. A braking system according to claim 16 wherein the sensor device senses when the accelerator control is moved to or near to its maximum extent to select top or near top speed, and the controller in response deactivating the charging valve.

19. A braking system according to claim 14 wherein where the braking system is for a machine with a ground engaging structure, the sensor device senses an operating parameter of the machine being a movement of a manual brake operating member, and the controller in response, activating the charging valve.

20. A braking system according to claim 1 wherein a restoring force to urge the brake actuator against the force exerted by the pressurised hydraulic fluid to release the brake, is provided by a resilient element.

21. A braking system according to claim 20 wherein the master valve includes a resilient element to urge the operating piston back towards a rest position when the brake operating member is released.

22. A machine with a ground engaging structure by means of which the machine may be driven on the ground, and a braking system, the braking system including a brake actuator which is moveable by pressurised hydraulic fluid fed to the actuator along a transmission line, in a first direction, to move a brake applying member to apply a braking force to a member to be braked, a master valve including an operating piston which upon operation of a brake operating member, moves in an operating cylinder, to direct the hydraulic fluid under pressure to the transmission line to apply the brake, the system further including a charging valve, the charging valve being operable when activated, to deliver a predetermined volume of pressurised hydraulic fluid to an inlet of the master valve, and hence to the transmission line, so as to move the brake applying member in the first direction towards the member to be braked to reduce the clearance between them, and the operating piston, when the charging valve is deactivated, being moveable in the operating cylinder to allow hydraulic fluid to pass from the transmission line thus to permit the brake actuator to move in a second direction opposite to the first direction to increase the running clearance between the brake applying member and the member to be braked, and which includes a source of pressurised hydraulic fluid, the charging valve when activated, permitting the pressurised hydraulic fluid from the source to move a charging piston from an initial position in a charging cylinder, to displace hydraulic fluid which is directed to the master valve, and when deactivated, the charging valve connecting the charging cylinder to a low pressure area to permit the charging piston to return to the initial position.

* * * * *